(12) United States Patent
Urgeghe et al.

(10) Patent No.: US 7,972,484 B2
(45) Date of Patent: Jul. 5, 2011

(54) GAS DIFFUSION ELECTRODE FOR ELECTROLYTE-PERCOLATING CELLS

(75) Inventors: Christian Urgeghe, Redecesio-Segrate (IT); Fulvio Federico, Piacenza (IT)

(73) Assignee: Industrie De Nora S.p.A., Milan (IT)

( * ) Notice: Subject to any disclaimer, the term of this patent is extended or adjusted under 35 U.S.C. 154(b) by 0 days.

(21) Appl. No.: 12/249,301

(22) Filed: Oct. 10, 2008

(65) Prior Publication Data

US 2009/0035615 A1  Feb. 5, 2009

Related U.S. Application Data

(63) Continuation of application No. PCT/EP2007/053564, filed on Apr. 12, 2007.

(30) Foreign Application Priority Data

Apr. 12, 2006 (IT) .............................. MI2006A0726

(51) Int. Cl.
*C25B 9/06* (2006.01)
*C25C 7/04* (2006.01)

(52) U.S. Cl. ..... 204/263; 204/252; 204/242; 204/275.1; 204/265; 204/266; 204/277; 204/278

(58) Field of Classification Search ............... 204/242, 204/252, 283, 284, 263, 265, 266, 275.1, 204/277, 278
See application file for complete search history.

(56) References Cited

U.S. PATENT DOCUMENTS

| 4,435,267 | A  | * | 3/1984  | Batzold et al. ................ 204/284 |
| 7,083,708 | B2 | * | 8/2006  | Chlistunoff et al. .......... 204/252 |
| 2001/0045364 | A1 |   | 11/2001 | Hockaday et al. |
| 2005/0000798 | A1 | * | 1/2005  | Faita et al. .................... 204/242 |
| 2005/0026005 | A1 | * | 2/2005  | Chlistunoff et al. ............ 429/12 |
| 2005/0029116 | A1 | * | 2/2005  | Bulan et al. ................... 205/334 |
| 2005/0183951 | A1 | * | 8/2005  | Oldani et al. ................. 204/279 |

FOREIGN PATENT DOCUMENTS

| WO | WO 98/45503 A | 10/1998 |
| WO | WO 01/57290  | 8/2001 |

OTHER PUBLICATIONS

International Search Report for PCT/EP2007/053564 Mailed Dec. 3, 2007.

* cited by examiner

*Primary Examiner* — Bruce F Bell
(74) *Attorney, Agent, or Firm* — Eschweiler & Associates, LLC

(57) ABSTRACT

The invention relates to a gas-diffusion electrode for chlor-alkali electrolysis cells integrated in a percolator of plastic porous material suitable for being vertically crossed by a downward flow of electrolyte. The electrode comprises a catalytic composition based on silver and/or nickel mixed to a polymeric binder, directly supported on the percolator without any interposed reticulated metal current collector.

14 Claims, No Drawings

GAS DIFFUSION ELECTRODE FOR ELECTROLYTE-PERCOLATING CELLS

CROSS-REFERENCE TO RELATED APPLICATION

This application is a continuation of PCT/EP2007/053564, filed Apr. 12, 2007, that claims the benefit of the priority date of Italian Patent Application No. MI MI2006A00726, filed on Apr. 12, 2006, the contents of which are herein incorporated by reference in their entirety.

BACKGROUND

The invention relates to the field of electrolytic cells, with particular reference to electrolyte-percolating electrolysis cells. In the following, reference will be made to the particular case of cells for depolarised chlor-alkali electrolysis making use of oxygen-fed gas-diffusion cathodes, since they largely represent the most relevant industrial application for such class of devices. However, those skilled in the art will appreciate the applicability of the same invention to other percolation-type cells, wherein the electrode of the invention may be applied as the anode or as the cathode, or optionally for both uses (as occurs for instance in the known case of alkaline fuel cells with percolating electrolyte).

Advanced chlor-alkali electrolysis is carried out with cells separated into a cathodic compartment and an anodic compartment by means of an ion-exchange membrane; the depolarised process with oxygen cathode provides the suppression of the hydrogen evolution cathodic reaction, typical of the chlor-alkali process of the previous generation, by means of the reduction of a flow of oxygen taking place on the surface of a gas-diffusion cathode, with consequent cell voltage lowering of about 30% in the common operative conditions. Making reference to the most typical case of an electrolysis of sodium chloride brine, as a replacement for the reaction typical of the traditional process:

$$2NaCl + 2H_2O \rightarrow 2NaOH + Cl_2 + H_2$$

the following overall reaction is accomplished:

$$4NaCl + 2H_2O + O_2 \rightarrow 4NaOH + 2Cl_2$$

The gas-diffusion cathode whereon the oxygen reduction is carried out is a porous structure usually consisting of a reticulated metallic material (normally silver or nickel optionally coated with a silver thin film, in order to withstand the highly corrosive conditions) acting as current collector and as mechanical support for a porous material displaying diffusive properties, in its turn usually comprising a metal catalyst to promote the oxygen reduction reaction, a polymer binder and optionally a filling material based on carbon or other preferably conductive inert. Besides the reduction of oxygen, the production of a caustic solution in the liquid phase takes place at the cathode of this type of cell; the cathode is therefore on one hand supplied with an oxygen gas flow, and on the other hand put in contact with a solution consisting of a caustic product that has to be efficiently extracted from the electrode porosity. In cells of industrial size, the hydraulic head established between gas and solution side must be adequately compensated to make the electrodic structure capable of withstanding the same without being flooded by the caustic product (or conversely, in case of negative pressure differential with respect to the solution, of preventing sensible oxygen losses). Several solutions were proposed in the past to overcome this problem, the most effective of which consists of allowing the caustic product to percolate across a suitable porous element interposed between the cathode surface opposite the gas side and the ion-exchange membrane, as disclosed for instance in the international patent application WO 01/57290, incorporated herein in its entirety. In this way, the pressure of caustic hydraulic head is efficiently released along the whole electrode height.

As a further advantage, the presence of a porous percolator allows transmitting a mechanical pressure from the anodic surface to the cathodic one across the membrane, the percolator itself and the gas-diffusion cathode. In such a way the electric current may be transferred from the cathodic current collector—suitably provided with an elastic structure—to the gas-diffusion cathode by contacting its back surface in a distributed fashion (and not in a localised one, for example by welds, as is the case for other cell configurations). It follows that with this arrangement, the gas-diffusion cathode can forgo the presence of an internal current collecting structure.

In the document cited herein, there is disclosed in particular the use of metallic percolators, such as nickel foams; however, to prevent the corrosion phenomena which take place in such an aggressive environment from giving rise to the dangerous release of metal ions into the caustic solution, it is preferable to employ a corrosion-resistant plastic-material, for instance a perfluorinated material, as the percolator, as disclosed in the international patent application WO 03/042430, incorporated herein in its entirety.

The solution proposed in the latter document however does not entirely solve the corrosion and metal ion contamination problems, since the same gas-diffusion cathode, as previously mentioned, normally consists of a metallic backbone, usually a silver or silver-plated nickel structure: in fact, the only constructive alternative to the metal mesh of the prior art consists of using carbonaceous substrates (for instance carbon cloths), also prone to the corrosive action of the caustic solution which, in combination with the electrical potential level established by the oxygen flow, spoils their mechanical properties after a certain time. Besides being subject, to a certain extent, to dissolution phenomena, the metal meshes of the prior art involve heavy problems of cost limiting the commercial success of these technologies indicatively, the meshes employed in the more widespread chlor-alkali applications consist of pure silver at an overall loading of about 500 g/m$^2$, while in the case of silver-plated nickel the higher costs of production strongly limit the projected savings, besides providing a product of overall lesser quality in terms of corrosion resistance.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, the invention comprises a gas-diffusion electrode structure for electrolysis cells, suitable for use in electrolyte percolation-type electrochemical cells, also suitable for use with aggressive electrolytes, especially alkaline ones, comprising a substrate overcoming the limitations of the prior art. The design of electrolyte percolation-type cell equipped with gas-diffusion electrode is characterised by a peculiar structural simplicity and by a reduced cost.

There is also provided herein a novel method for manufacturing a gas-diffusion electrode suitable for use in percolation-type cells.

To the accomplishment of the foregoing and related ends, the following description sets forth certain illustrative aspects and implementations. These are indicative of but a few of the various ways in which one or more aspects may be employed. Other aspects, advantages, and novel features of the disclosure will become apparent from the following detailed description.

DESCRIPTION

The invention comprises a gas-diffusion electrode obtained by application of a catalytic composition on one face of a hydrophobic porous substrate suitable for supporting the percolation of an electrolyte flow. The application of the catalytic composition is effected so as to obtain only a partial penetration of the substrate, which can thereby act as percolator in the unoccupied volume fraction. The integration of the electrode within the structure of the percolator itself is thereby obtained, combining the two functions in a single piece, substantially decreasing the costs and enhancing the facility of assemblage of the relative cell. The thus-obtained electrode in particular does not require any metal mesh or other reticulated material interposed between catalytic activation and percolator.

In one embodiment of the invention, the catalytic composition is a mixture of metal catalysts with a suitable polymer binder, and is can be free of carbonaceous materials, which is especially important when oxygen is present in combination with a strongly basic electrolyte. In the case of gas-diffusion cathodes for chlor-alkali electrolysis, the metal catalyst is comprises one or more of silver, nickel and relevant oxides, optionally in admixture. The polymer binder comprises a perfluorinated polymer, for instance PTFE or the like. According to one embodiment, the metal catalyst and binder are mixed in an optionally aqueous solution, dispersion or suspension, until obtaining a paste which can be pressed, for instance by calendering, directly against the porous substrate suitable to act as percolator. To obtain a sufficient mechanical stabilisation, a thermal treatment is then carried out, optionally comprising a preliminary drying step at low temperature followed by a subsequent step at higher temperature.

According to one alternative embodiment, the catalytic composition is applied by decal transfer and subsequent pressure melting of a catalytic sheet on the porous substrate, also in this case followed by a final thermal treatment.

As regards the thermal treatment, the best results are obtained with a final maximum temperature comprised in a range from between 200° C. and 380° C., depending on the type of selected binder and its rheological characteristics as a function of temperature, as one skilled in the art can easily determine.

The choice of the hydrophobic porous structure must take into account the need of having a sufficient volume available for liquid percolation after applying the catalytic composition on the active face. In one embodiment, the porous structure comprises a mesh or cloth of polymeric material, for instance PTFE, with a sufficient thickness, for example, not lower than 0.7 mm. One skilled in the art can easily identify preferred thicknesses and geometries of the mesh or cloth depending on the electrolyte density, the height of the hydraulic head to be discharged and the required fluid dynamic conditions.

A cell according to the invention will be provided with an integrated element acting both as the gas-diffusion electrode and as the percolator, with consequent assembly simplification and cost reduction. In some cases (for instance, in the case of alkaline fuel cells), a cell may be constructed comprising two electrodes in accordance with the invention, for instance a hydrogen-fed anode and an oxygen-fed cathode, typically crossed by a downward caustic potash flow.

The invention will be better understood by aid of the following examples, which are not intended to limit the extent thereof, solely defined by the appended claims.

Example 1

20 g of a commercial PTFE aqueous suspension (Hostaflon® TF 5033, 40% by weight) and 136 ml of a 35% formaldehyde solution (Fluka®) were added slowly and under stirring to 800 ml of deionised water, keeping the mixture refrigerated at a temperature between 0 and 10° C. After one hour under continuous stirring, a solution containing 80 g $AgNO_3$ (Aldrich, 63.6% Ag by weight expressed as metal) and 800 ml of a 10% by weight solution of caustic potash were added dropwise, always keeping the pH between 7.5 and 10 and the temperature below 15° C. The operation required a little less than 2 hours and the solution was kept under vigorous stirring for two additional hours. Upon completion of the reaction, the precipitate obtained was decanted eliminating the supernatant liquid. The solid, filtered under vacuum, was rinsed with 2 liters of deionised water and 600 ml of petroleum ether. The product was dried in air at 120° C. overnight. A catalytic material with about 87% Ag by weight was so obtained, more than sufficient for the preparation of 200 $cm^2$ of gas-diffusion electrode.

Comparative Example 1

30 g of the catalytic material prepared in Example 1 were suspended in 90 ml of 2-propanol. The suspension was poured on a medium porosity filtering membrane, removing the alcohol excess under vacuum. The resulting cake was then pressed with a calender in several passages on a 40 mesh silver net (0.3 mm thick), up to complete coverage of the surface. After a drying step at 100° C., the electrode was treated in air at 250° C. for 15 minutes in a muffle.

The cathode was assembled on a single cell lab electrolyser of 0.1 $m^2$ active area as disclosed in WO 03/042430, coupled to a 1 mm thick PTFE percolator. A Nafion® ion-exchange membrane commercialised by DuPont/USA was employed as the separator between the cell compartments.

The anodic compartment was fed with sodium chloride brine, while the percolator, inserted in the cathodic compartment, was fed with a 25 l/h caustic soda downward flow. The gas-diffusion cathode was fed with an excess of oxygen. At a temperature of 85° C. and at a current density of 4 $kA/m^2$, a cell voltage of 2.10 V was measured after three days of stabilisation from the start-up, which remained stable for more than 30 days.

Example 2

30 g of the catalytic material prepared in Example 1 were suspended in 90 ml of 2-propanol. The suspension was poured on a medium porosity filtering membrane, removing the alcohol excess under vacuum. The resulting cake was then pressed with a calender in several passages on a PTFE percolator (1.5 mm nominal thickness), up to complete coverage of the surface but penetrating its volume only partially, leaving an unoccupied portion at least 1 mm thick. After a drying step at 100° C., the electrode was treated in air at 250° C. for 15 minutes in a muffle.

The cathode with integrated percolator so-obtained was assembled on a single cell lab electrolyser of 0.1 $m^2$ active area as disclosed in WO 03/042430, in direct contact with a Nafion® ion-exchange membrane commercialised by DuPont/USA which acted as the separator between the cell compartments. The anodic compartment was fed with sodium chloride brine, while the non activated face of the cathode employed as percolator was fed with a 25 l/h caustic soda downward flow. The gas-diffusion cathode was fed with excess oxygen. At a temperature of 85° C. and at a current density of 4 kA/m$^2$, a cell voltage of 2.07 V was recorded after three days of stabilisation from the start-up, which remained stable for more than 30 days.

It was thus demonstrated that the electrode with percolator of the invention, was easier to assemble, less expensive and less prone to deterioration phenomena than the gas-diffusion electrodes of the prior art, and has an equivalent or even superior performance in terms of current efficiency in a largely representative industrial application.

Although the disclosure has been shown and described with respect to one or more embodiments and/or implementations, equivalent alterations and/or modifications will occur to others skilled in the art based upon a reading and understanding of this specification. The disclosure is intended to include all such modifications and alterations and is limited only by the scope of the following claims. In addition, while a particular feature may have been disclosed with respect to only one of several embodiments and/or implementations, such feature may be combined with one or more other features of the other embodiments and/or implementations as may be desired and/or advantageous for any given or particular application. Furthermore, to the extent that the terms "includes", "having", "has", "with", or variants thereof are used in either the detailed description or the claims, such terms are intended to be inclusive in a manner similar to the term "comprising."

The invention claimed is:

1. An electrochemical percolation cell equipped with at least one gas-diffusion electrode comprising a hydrophobic porous substrate made from a single piece and a catalytic composition applied to one face thereof, a volume fraction of said porous substrate being penetrated by said catalytic composition, the corresponding unoccupied volume fraction of said porous substrate being internally crossed by a downward electrolyte flow.

2. The cell of claim 1, the catalytic composition comprising at least one metal powder and at least one polymer binder.

3. The cell of claim 2, the at least one metal powder comprising silver, nickel or oxides thereof.

4. The cell of claim 2, the at least one polymer binder comprising a perfluorinated polymer.

5. The cell of claim 1, the porous substrate having a thickness not lower than 0.7 mm.

6. The cell of claim 1, the hydrophobic porous substrate comprising a mesh or cloth of polymer material.

7. The cell of claim 6, the polymer material comprising a perfluorinated polymer.

8. The cell of claim 1, the catalytic composition applied directly on one face of the hydrophobic substrate, with no interposed reticulated metallic material.

9. The cell of claim 1, the cell containing an electrolyte comprising a caustic solution.

10. The cell of claim 1, the gas diffusion electrode made by a process, comprising:
    preparing a paste containing components of a catalytic composition starting from an optionally aqueous solution, dispersion or suspension;
    pressing of the paste on one face of a hydrophobic porous substrate made from a single piece to obtain a partial penetration of the paste into the hydrophobic porous substrate; and
    executing a thermal treatment up to a maximum temperature in a range of from 200° C. to 380° C.

11. The process of claim 10, the step of pressing carried out by calendering.

12. The cell of claim 1, the gas diffusion electrode made by a process, comprising:
    applying a catalytic composition to a decal support, until obtaining a catalytic sheet;
    pressure melting of the catalytic sheet on one face of a hydrophobic porous substrate;
    executing a thermal treatment up to a maximum temperature in the range of from 200° C. to 380° C.

13. The electrochemical percolation cell of claim 1, the gas-diffusion electrode comprising an oxygen-fed gas-diffusion cathode in a chlor-alkali process.

14. The electrochemical percolation cell of claim 1, the gas-diffusion electrode comprising an oxygen-fed gas-diffusion cathode or a hydrogen-fed gas-diffusion anode in an electrolyte percolation alkaline fuel cell.

* * * * *